United States Patent [19]

Katsurayama et al.

[11] 4,109,286
[45] Aug. 22, 1978

[54] CASSETTE TAPE RECORDER WITH CASSETTE EJECT MECHANISM

[75] Inventors: Hiromasa Katsurayama; Nobuhiro Hirabayashi, both of Nagoya, Japan

[73] Assignee: Shin-Shirasuna Electric Corp., Nagoya, Japan

[21] Appl. No.: 789,513

[22] Filed: Apr. 21, 1977

[30] Foreign Application Priority Data

Apr. 30, 1976 [JP] Japan .................................. 51-50410
Aug. 10, 1976 [JP] Japan .................................. 51-95060
Aug. 10, 1976 [JP] Japan .................................. 51-95061

[51] Int. Cl.$^2$ ..................... G11B 23/04; G11B 15/10; G11B 15/24
[52] U.S. Cl. ..................................... 360/96; 242/198
[58] Field of Search ...................... 360/137, 93, 95-96; 242/198-200

[56] References Cited

U.S. PATENT DOCUMENTS

| | | | |
|---|---|---|---|
| 3,458,158 | 7/1969 | Ohira | 360/96 |
| 3,638,953 | 2/1972 | Kodama et al. | 360/96 |
| 3,807,653 | 4/1974 | van der Maaden | 360/96 |
| 3,849,799 | 11/1974 | Nakamichi | 360/96 |
| 3,902,681 | 9/1975 | Boehme | 360/96 |
| 3,996,618 | 12/1976 | Suzuki | 360/96 |
| 4,017,900 | 4/1977 | Katsurayama | 360/96 |

*Primary Examiner*—Alfred H. Eddleman

[57] ABSTRACT

In a cassette tape recorder including cassette receiving means pivotable between an inclined position where a cassette can be inserted therein or removed therefrom and a horizontal position where the cassette is held so that a magnetic tape contained therein can be transported, a cassette eject mechanism comprising cassette force-out means mounted on the cassette receiving means and pivotable between a first position which it is made to assume when the cassette receiving means is at the inclined position and a second position which it is made to assume when the cassette receiving is at the parallel position, and lock means mounted on the cassette receiving means for acting to lock the cassette force-out means in the second position upon the cassette being fully inserted in the cassette receiving means and to unlock the cassette force-out means when the cassette receiving means is pivoted from the inclined position to the parallel position. When the cassette receiving means with the cassette fully inserted therein is pivoted from the parallel position to the inclined position, the cassette force-out means is resiliently pivoted from the second position to the first position so as to have one end thereof extended into the cassette receiving means so that the cassette is thereby forced out of the cassette receiving means. There is also provided means for preventing the cassette from striking the heads of the recorder and so forth when the cassette is forced out of the cassette receiving means.

6 Claims, 21 Drawing Figures

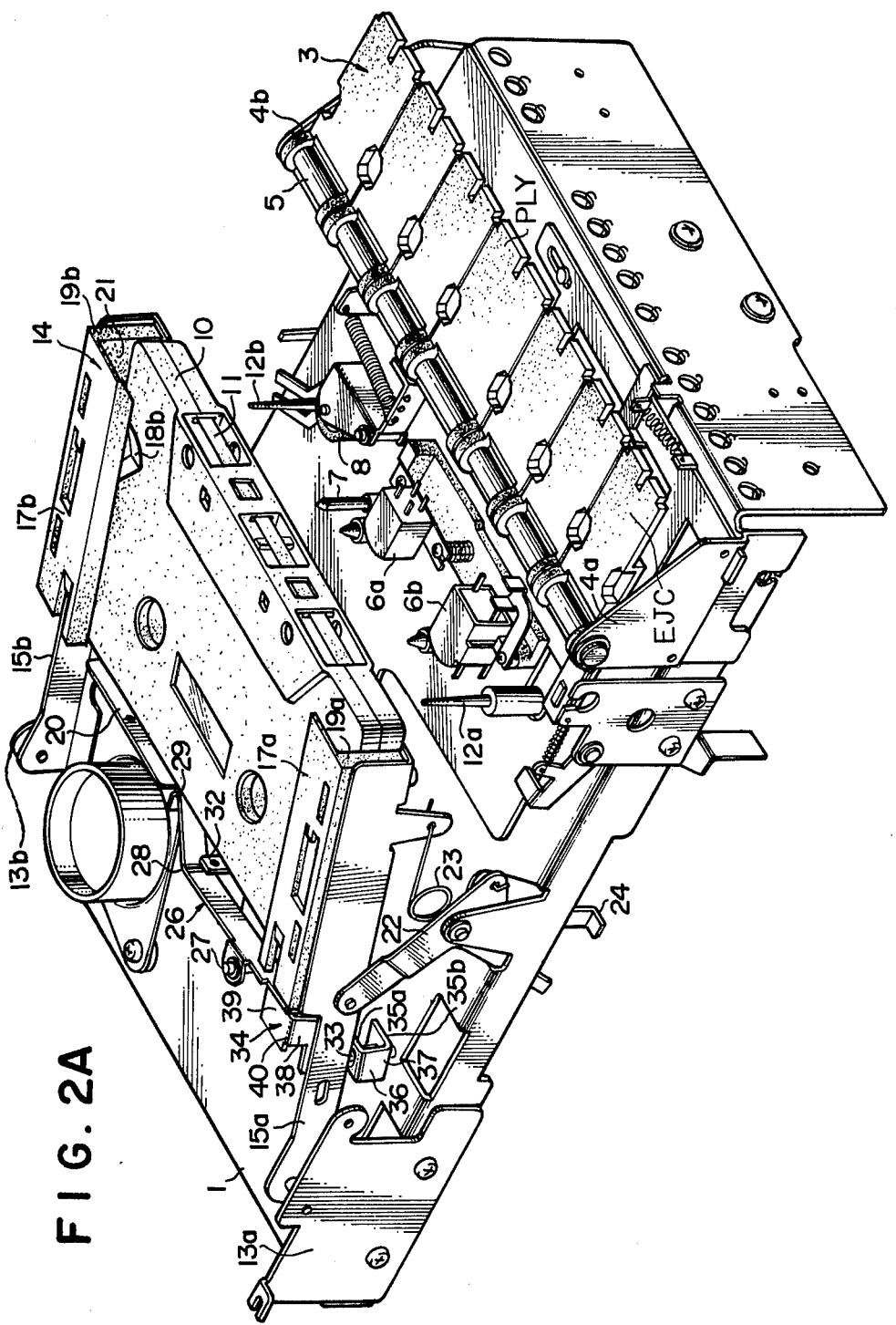

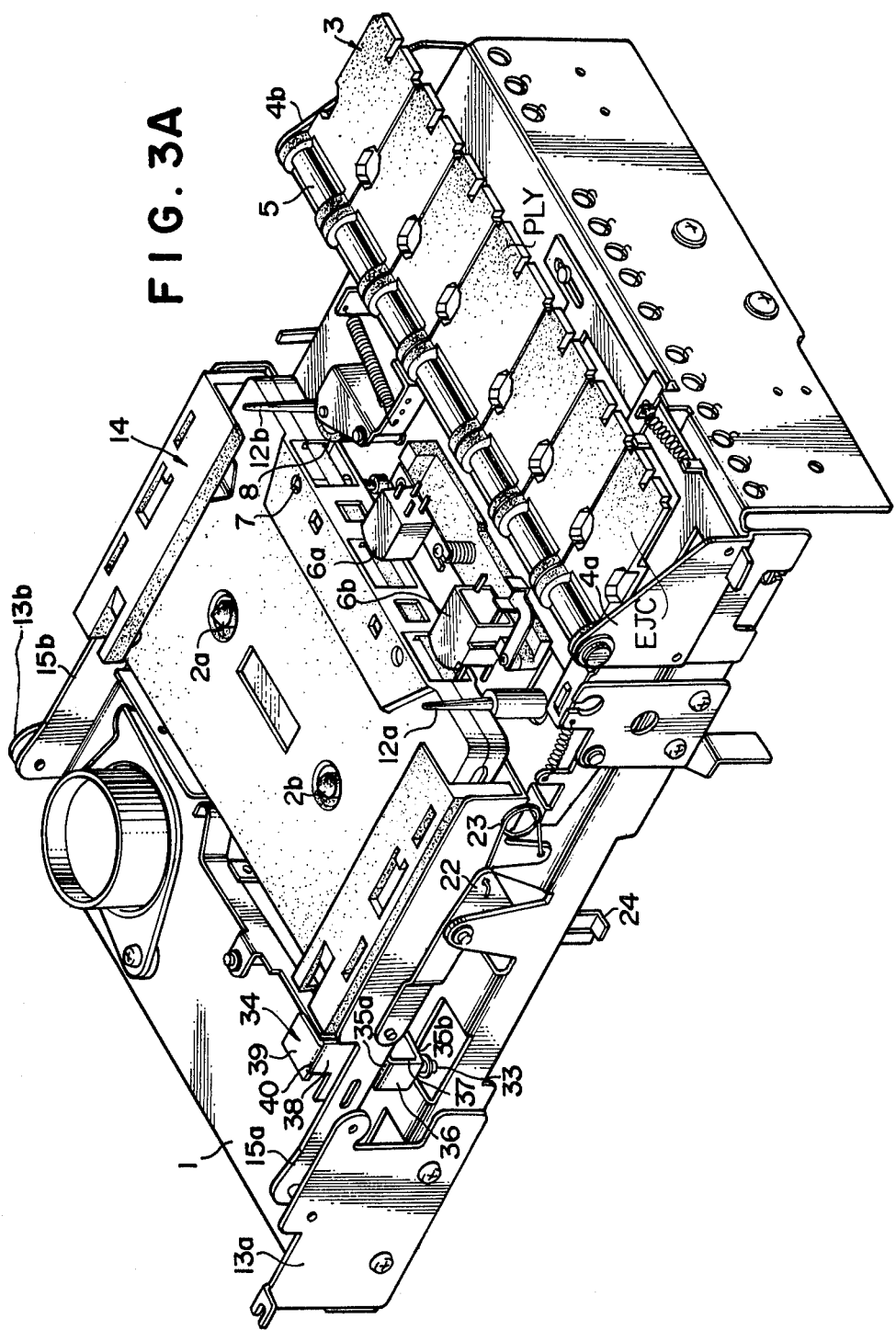

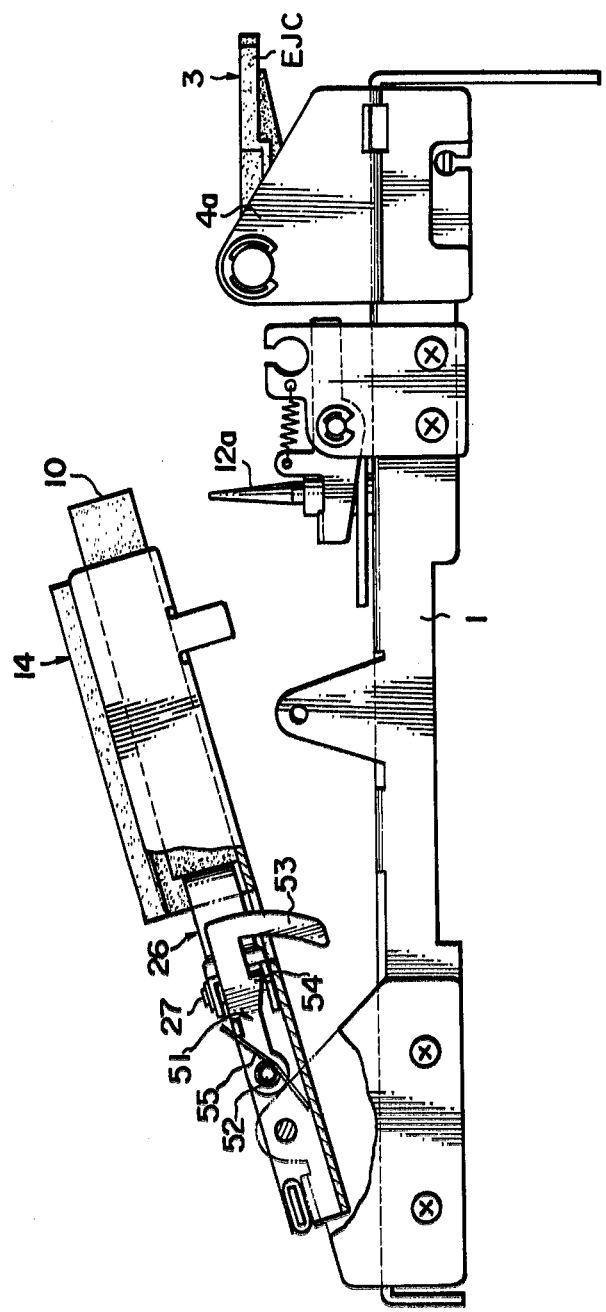

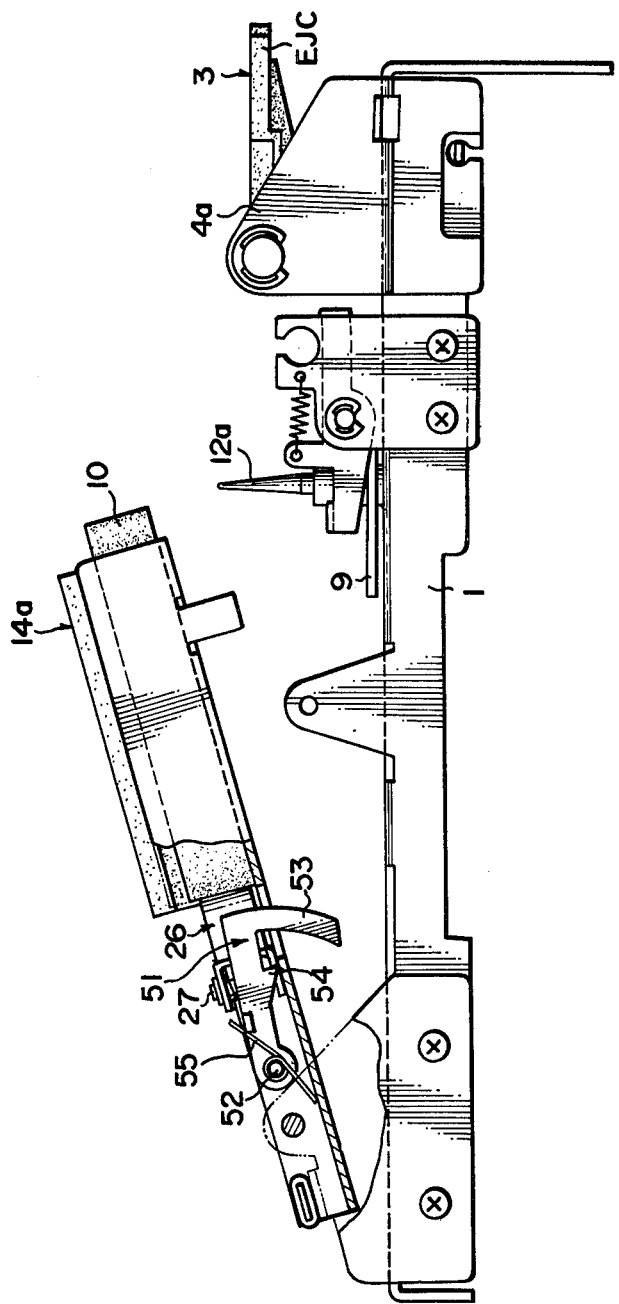

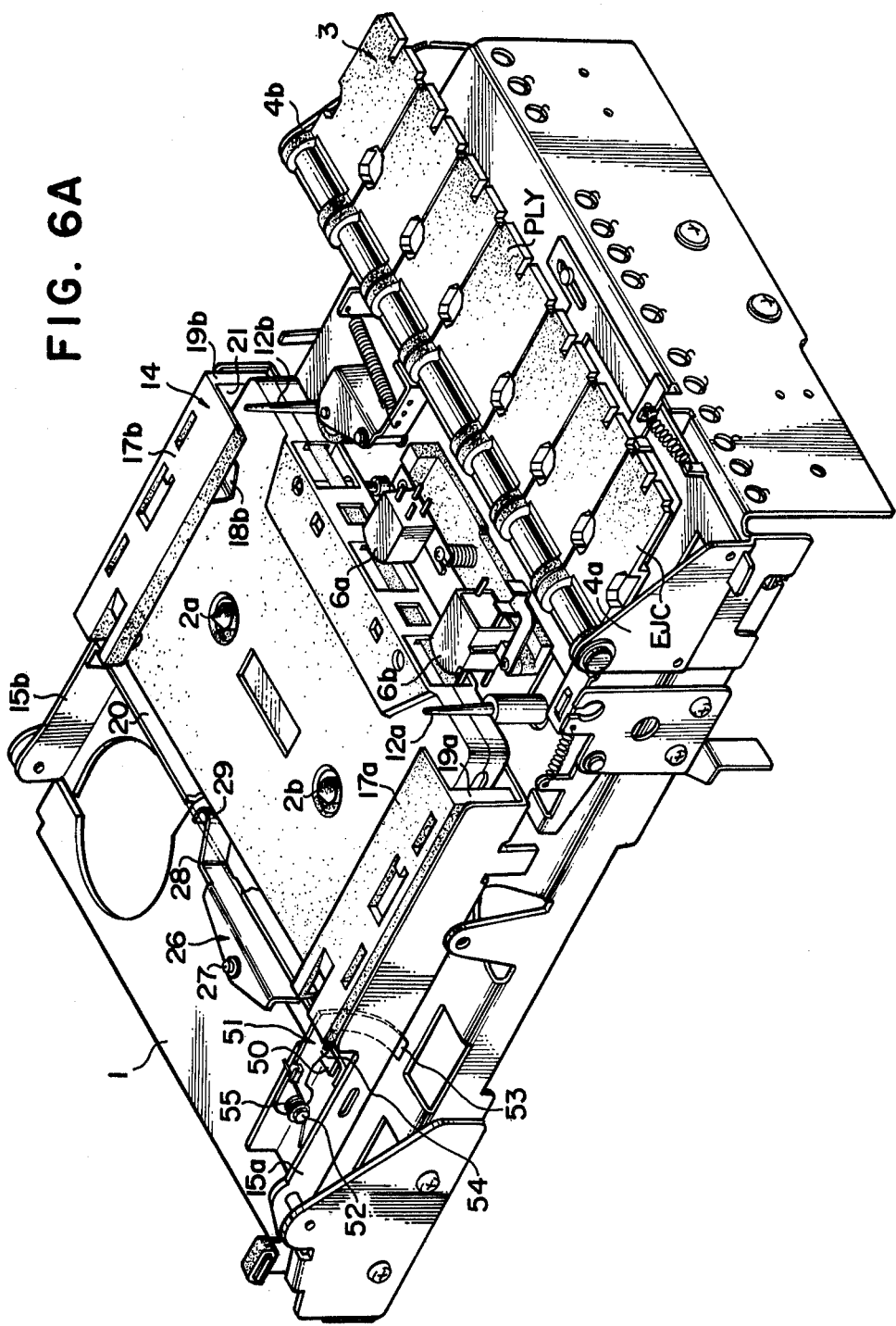

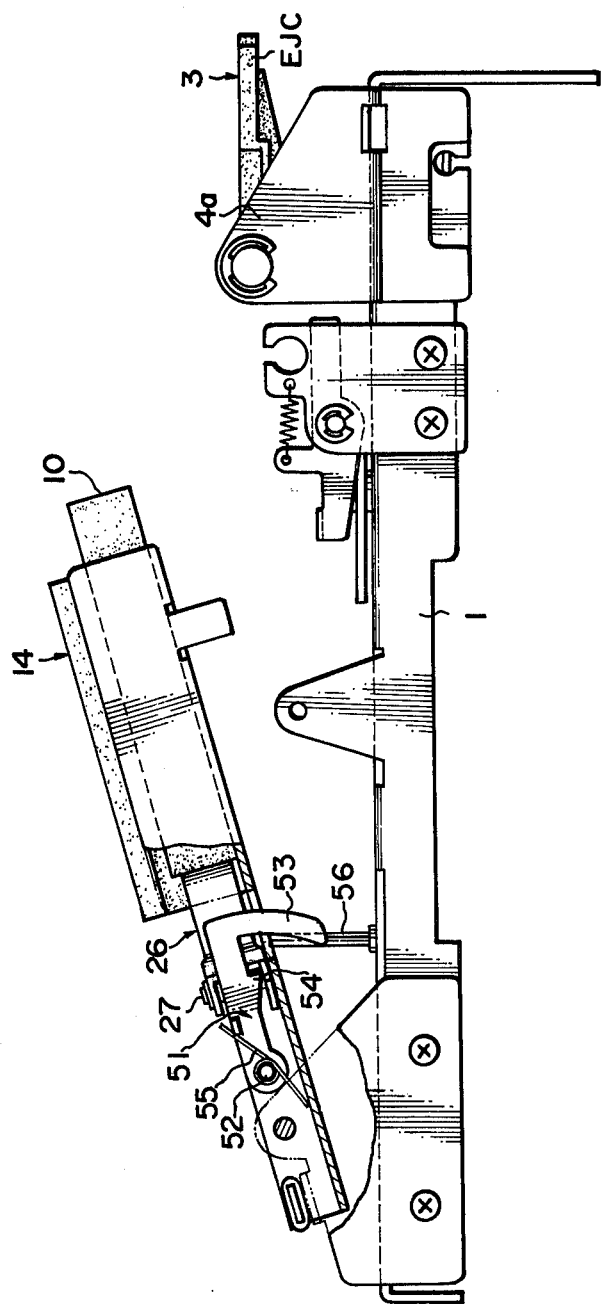

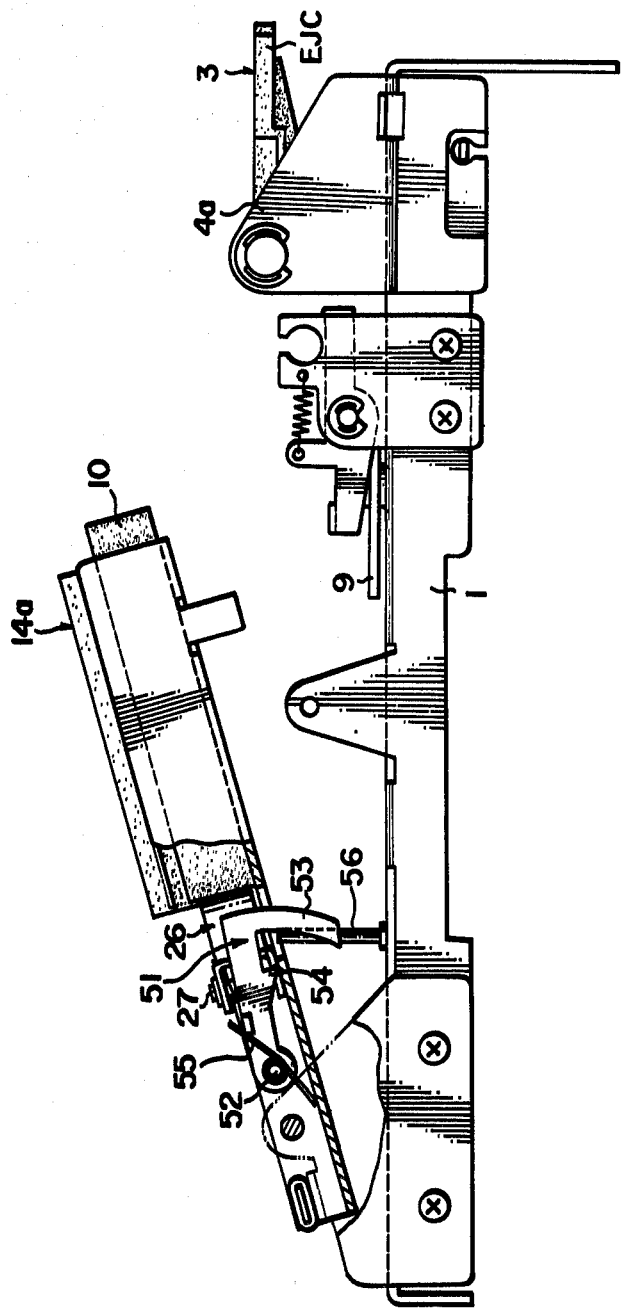

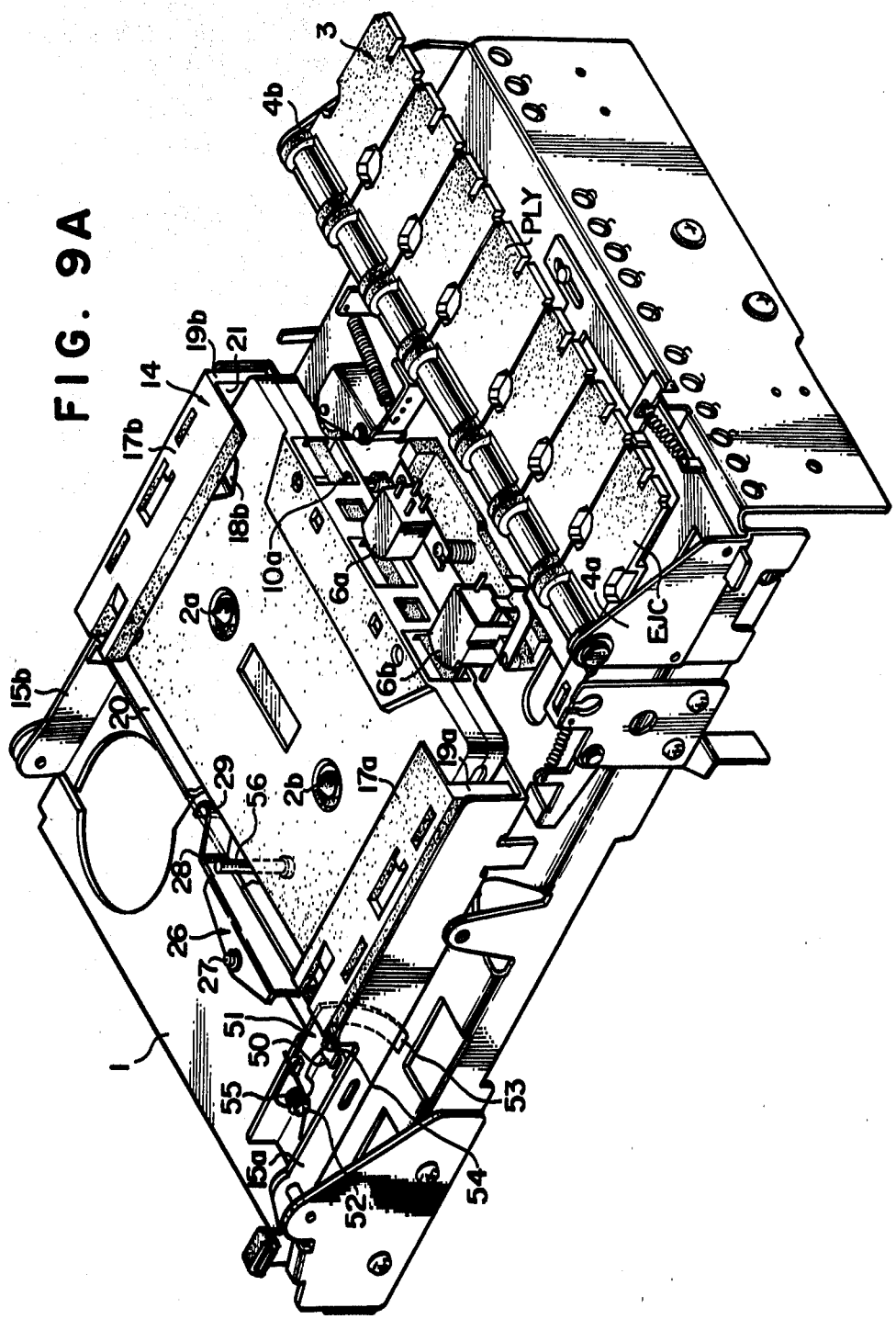

CASSETTE TAPE RECORDER WITH CASSETTE EJECT MECHANISM

This invention relates to a cassette tape recorder, and more particularly to a cassette tape recorder provided with a so-called cassette eject mechanism.

Tape recorders provided with a cassette eject mechanism have already been proposed and put into use, which eject mechanism is designed such that when a cassette mounted to the tape recorder is to be removed, a so-called "eject" key is depressed to pivotally move a pivotable cassette receptacle, in which the cassette is received, to bring the cassette receptacle into an inclined position with respect to the chassis of the tape recorder while, at the same time, forcing the cassette partly out of the cassette receptacle. In the prior art cassette eject mechanism, however, means for pivotally moving the cassette receptacle and means for forcing the cassette out of the cassette receptacle in the described manner have been associated with a common eject key and this has required a great force to be exerted for operation of the "eject" key, which has in turn led to difficulties such as unfavorable operability and much complicated construction of the eject mechanism itself.

Furthermore, cassette tape recorders have heretofore adopted such constructions, in order to prevent a cassette from striking the head or the edge of the case when the cassette is forced out of cassette receiving means (cassette holder), that a pair of tapered guide pins are provided on the chassis of the tape recorder or a pair of ribs are provided on the case itself so as to guide the cassette with the front edge thereof bearing against those guide pins or ribs during the force-out until the cassette has been forced out beyond the head or the edge of the case.

However, in most of these conventional constructions, a force-out pressure is imparted to the back wall of the cassette only after the point of time whereat the cassette holder begins to be raised to force out the cassette, with a result that the capstan inserted in an apertute in the cassette is subjected to an undesirable force with the edge of that aperture bearing against the capstan.

It is therefore an object of the present invention to provide a cassette tape recorder provided with a cassette eject mechanism which is excellent in operability and simple in construction.

It is a further object of the present invention to provide a tape recorder which may overcome the above-noted problems by a very simple means without providing the above-described guide pins or ribs.

Other objects, features and advantages of this invention will become apparent from the following description taken in conjunction with the accompanying drawings.

FIGS. 1 through 3 show the cassette tape recorder according to an embodiment of this invention;

FIGS. 2A, 2B and 2C are a perspective view, a top plan view and a rear view, respectively, showing the cassette as fully inserted from the position of FIG. 1;

FIGS. 3A, 3B and 3C are a perspective view, a top plan view and a rear view, respectively, showing the cassette receiving means as it has been brought to its horizontal position from the position of FIG. 2;

FIGS. 4 through 6 show the cassette tape recorder according to another embodiment of this invention;

FIGS. 4A and 4B are a perspective view and a side view, respectively, showing the cassette as partly inserted in cassette receiving means in its inclined position;

FIGS. 5A and 5B are a perspective view and a side view, respectively, showing the cassette at fully inserted from the position of FIG. 4;

FIGS. 6A and 6B are a perspective view and a side view, respectively, showing the cassette receiving means as it has been brought to its horizontal position from the position of FIG. 5;

FIGS. 7 through 9 show the cassette tape recorder according to still another embodiment of this invention;

FIGS. 7A and 7B are a perspective view and a side view, respectively, showing the cassette as it is partly inserted in cassette receiving means in its inclined position;

FIGS. 8A and 8B are a perspective view and a side view, respectively, showing the cassette at fully inserted from the position of FIG. 7; and FIGS. 9A and 9B are a perspective view and a side view, respectively, showing the cassette receiving means at it has been brought to its horizontal position from the position of FIG. 8.

Figure 2B:
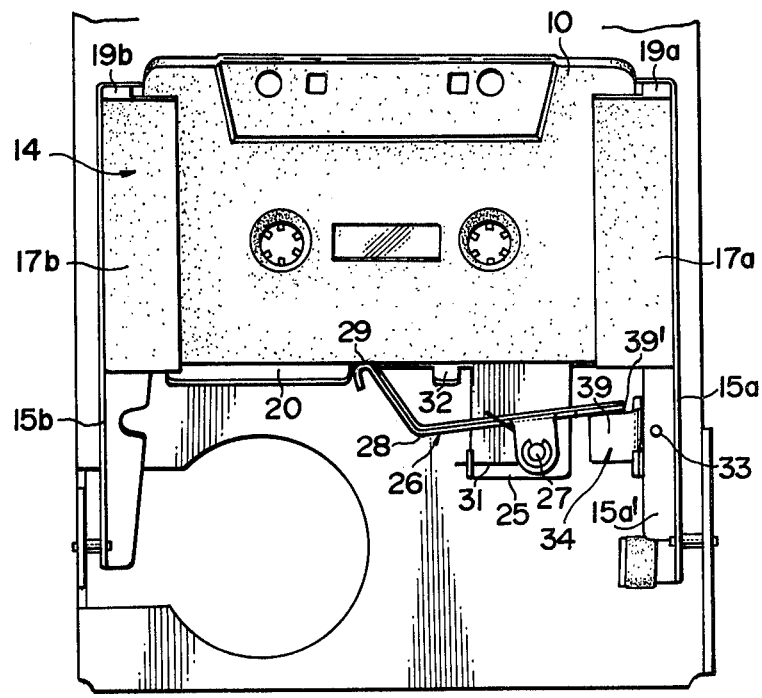
Figure 2C:
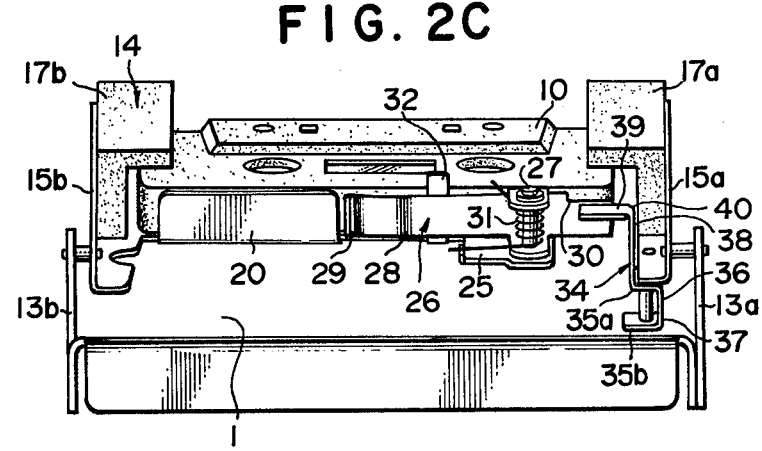
Figure 3B:
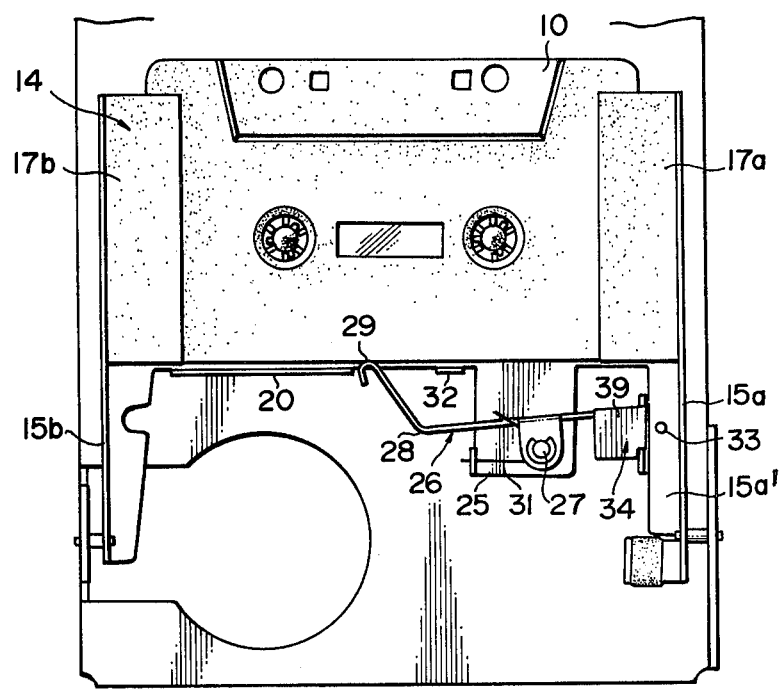

Referring to FIGS. 1 through 3 of the drawings, there is shown the cassette tape recorder according to a first embodiment of this invention. On top of a chassis 1, there are projectedly provided a pair of reel spindles 2a and 2b (see FIG. 3A), and at one side of the chassis 1, a row of keys 3 including a "play-back" key PLY and an "eject" key EJC are depressively mounted on a common shaft 5 extending between and attached to a pair of brackets 4a and 4b mounted on the chassis 1. Disposed between the reel spindles 2a, 2b and the row of keys 3 are a record-reproduce head 6a, an erase head 6b, a capstan 7, a pinch roller 8, etc. In the position shown in FIG. 3A, when the "play-back" key PLY is depressed, the heads 6a, 6b and the pinch roller 8 may be slidingly moved toward the reel spindles 2a, 2b, with a subchassis 9 on which they are mounted, so that each of the heads may be disposed in contact with a magnetic tape 11 within a cassette 10 and the pinch roller 8 may be brought into pressure engagement with the capstan 7. Designated by 12a and 12b are guide pins for the cassette.

A pair of upright brackets 13a and 13b are also mounted on the chassis 1, and cassette receiving means or receptacle member 14 for receiving the cassette therein is pivotally mounted between the pair of upright brackets by means of a pair of arms 15a and 15b. This receptacle member 14 has a bottom wall 16 formed with a pair of through-apertures (not shown) through which the reel spindles 2a and 2b are passed in the position of FIG. 3, a pair of side walls 19a and 19b having inwardly bent top portions as indicated by 17a and 17b, respectively, with plate springs 18a and 18b (only 18b is shown) being mounted to the inner surfaces of those top portions, and a partial back wall 20. In the front of the receptacle member 14, there is formed an opening 21 through which the cassette 10 may be inserted or removed.

Figure 1A:
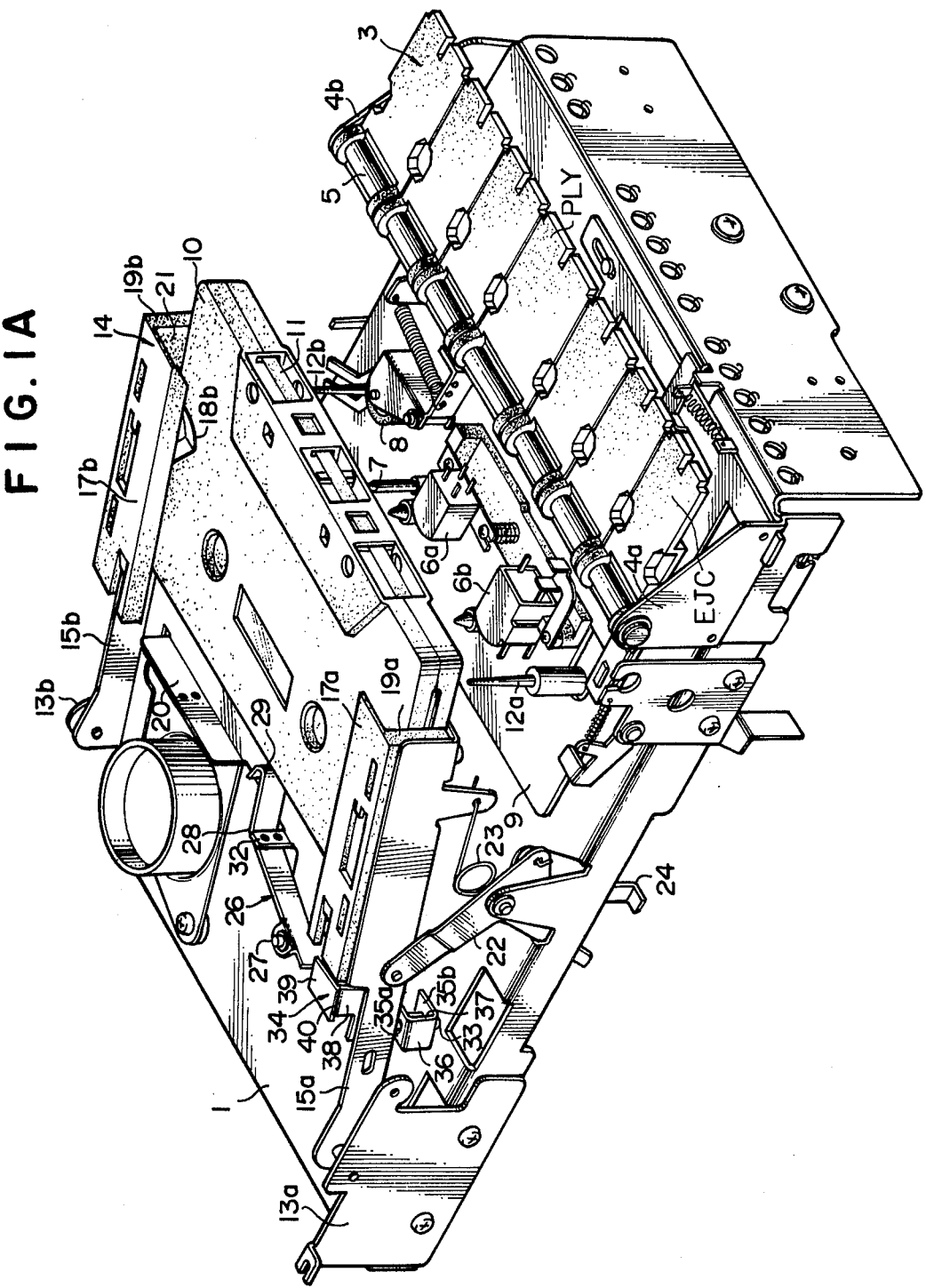
FIGS. 1A, 1B and 1C are a perspective view, a top plan view and a rear view, respectively, showing the cassette as partly inserted in cassette receiving means in its inclined position.

The receptacle member 14 may selectively assume a position as shown in FIG. 1A wherein it is inclined with respect to the chassis 1 so as to permit insertion or removal of the cassette 10, and a position as shown in FIG. 3A wherein it is parallel to the chassis, namely, horizontal as viewed in FIG. 3A. In the position of FIG. 3A, namely, in the parallel position described above, the receptacle member may be resiliently pivoted to the position of FIG. 1A, namely, the inclined position described above, upon depression of the "eject" key EJC. A member 22, a spring 23 and a projection 24 are elements which contribute to the above-described pivotal movement of the receptacle member 14, but these and other unnumbered elements do not directly pertain to the present invention and need not be described in detail.

In the shown embodiment of the present invention, a cassette force-out lever 26 is pivotally mounted on a planar mounting portion 25 by means of a pin 27, the planar mounting portion being projected from the bottom wall 16 of the receptacle member 14. The cassette force-out lever 26 is obtusely bent as indicated at 28, namely, at a portion substantially intermediate between the pivoted portion and one end portion 29 thereof, which is bent in U-shape, and the upper edge of the other end portion of the lever 26 is formed with a cut-away as indicated at 30. Also, the cassette force-out lever 26 is spring-biased by a coil spring 31 mounted on the pin 27 so that said one end portion 29 thereof is extended into the receptacle member 14 while the obtusely bent portion 28 is engaged with a projection 32 provided on the receptacle member 14 when the cassette is not at all inserted in the receptacle member 14 or when the cassette is partly inserted in the receptacle member in the manner as shown in FIG. 1A.

Figure 3C:
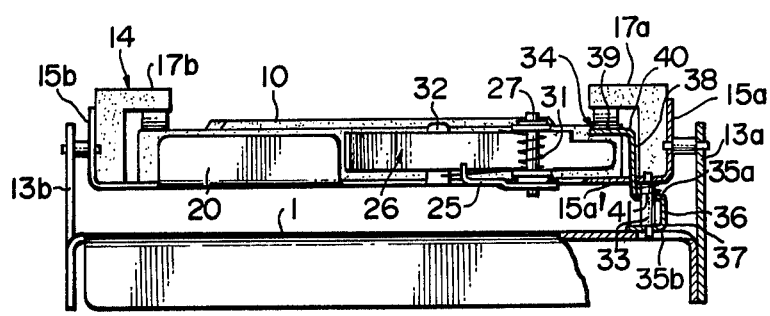

The arm 15a of the receptacle member 14 has integrally formed therewith a planar portion 15a' inwardly projected from the lower edge thereof and contiguous and flush with the bottom wall 16, and a lock member 34 is mounted on the planar portion 15a' by means of a pin 33 orthogonal to the planar portion, in such a manner that the lock member is displaceable axially of the pin. This lock member 34, as is well seen in FIG. 3C, is unitarily formed by a sidelong U-shaped lower portion 37 comprising parallel upper and lower legs 35a and 35b interconnected by a portion 36, and an upper portion 41 of inverted L-shaped cross section comprising a portion 38 extending upwardly from the upper leg 35a of the lower portion 37 beyond the inner edge of the planar portion 15a' of the arm 15 and a portion 39 inwardly bent from the portion 38 substantially perpendicularly thereto. The U-shaped lower portion 37 of the lock member 34 is located below the planar portion 15a' of the arm 15a, and pins 33 extend through the legs 35a and 35b of the U-shaped lower portion 37 so that the lock member 34 is displaceable along and axially of the pin 33. Further, as is also well seen in FIG. 3C, between the underside of the planar portion 15a' of the arm 15a and the upper leg 35a of the U-shaped lower portion 37 of the lock member 34, there is mounted a coil spring 41 surrounding the pin 33 and by this spring 41, the lock member 34 is downwardly biased, as viewed in FIG. 3C.

Figure 1B:
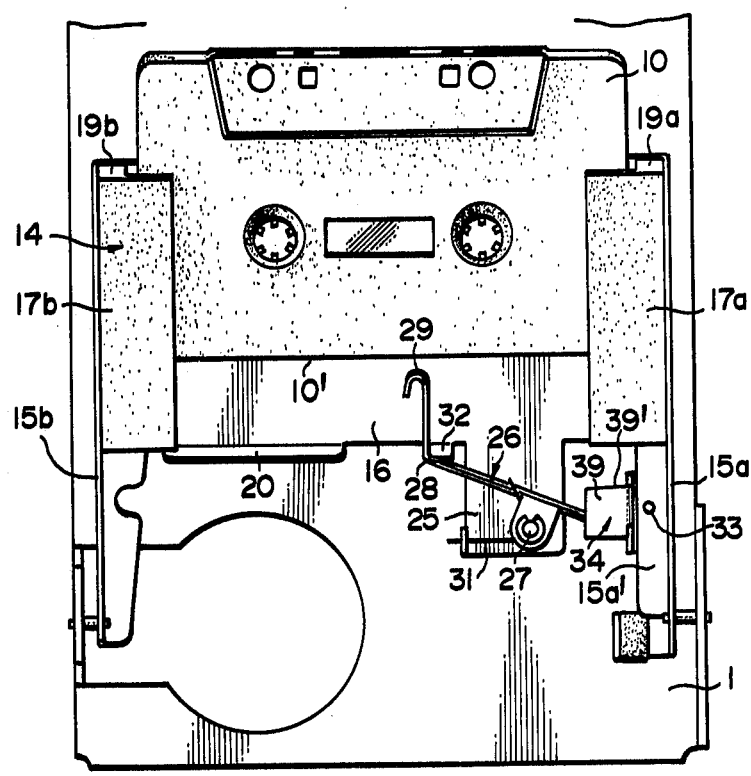
Figure 1C:
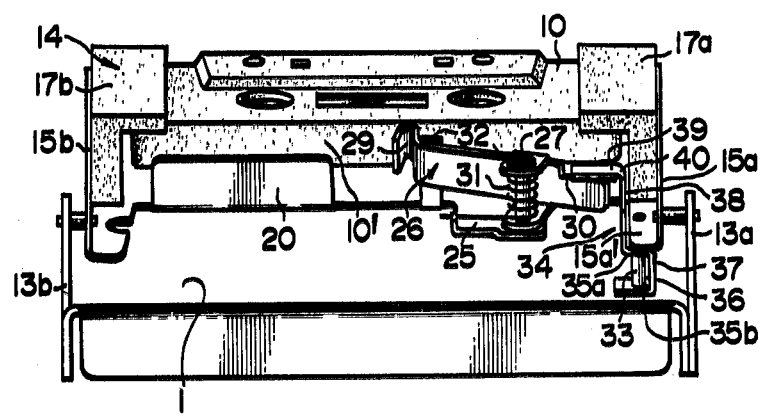

When the receptacle member 14 is in its inclined position with respect to the chassis and the cassette 10 is either partly inserted in the receptacle or not inserted at all, as shown in FIGS. 1A, 1B and 1C, then the cassette force-out lever 26 is positionally restricted by the projection 32 of the receptacle member 14 with the U-shaped end portion 29 of the lever 26 being extended into the receptacle member 14 in orthogonal relationship with the back wall 10' of the cassette 10 by the action of the spring 31 (FIG. 1C) and with the projection 32 engaged by the obtusely bent portion 28, as is well seen in FIG. 1B. In this case, the other end portion of the cassette force-out lever 26 is located below the inwardly perpendicularly bent portion 39 forming the top of the lock member 34 and the underside of the top 39 of the lock member 34 is biased into engagement with the cut-away 30 in the other end portion of the lever by the above-described biasing action of the spring 41.

In the position shown in FIG. 1, as the cassette 10 is further inserted into the receptacle member 14, said one end portion 29 of the cassette force-out lever 26 is pushed by the back wall 10' of the cassette 10 to pivot the lever 26 against the biasing force of the spring 31 until the cassette 10 is fully inserted into the receptacle member 14 as shown in FIGS. 2A, 2B and 2C, whereupon the other end portion of the lever 26 which is provided with the cut-away 30 is projected somewhat forwardly from the front edge 39' of the top 39 of the lock member 34, namely, toward the opening 21 of the receptacle member 14, as the result of which the top 39 of the lock member 34 is brought out of engagement with the cut-away 30 of the lever 26 and thus, the lock member 34 is depressed by the spring 41 while the front edge 39' of its top 39 is slidably engaged with the back surface of that end portion of the lever 26 which is provided with the cut-away 30. When the lock member 34 is in such depressed position, it is seen in FIG. 2C that the front edge 39' of the top 39 of the lock member 34 is in engagement with the back surface of that end portion of the cassette force-out lever 26 which is provided with the cut-away 30, whereby the rotation of the lever 26 by the spring 31 is blocked. That is, in this position, the lever 26 has one end portion 29 thereof bearing against the back wall 10' of the cassette 10 and has been fully rotated against the biasing force of the spring 31 (counter-clockwisely as viewed in FIG. 1B) and moreover, locked in that rotated position by the lock member 34. In this case, therefore, the lever 26 does not impart its force-out pressure to the cassette 10 and as shown in FIG. 2A, the cassette 10 remains fully inserted in the receptacle member 14.

Subsequently, when the receptacle member 14 is manually depressed from the position of FIG. 2 to the position of FIG. 3 parallel to the chassis 1, namely, the horizontal position, the aforementioned underside of the lower leg 35b of the lock member 34 strikes the chassis 1 just before the horizontal position is reached, so that the lock member 34 is raised against the force of the spring 41 until at last the front edge 39' of the top 39 of the lock member 34 is brought out of engagement with the back surface of that end portion of the cassette force-out lever 26 which is provided with the cut-away 30, whereby the above-described lock imparted to the lever 26 by the lock member 34 in the position of FIG. 2 is now released. As the result, the biasing force or force-out pressure of the spring 31 is imparted to the cassette 10 by way of the lever 26, whereby the cassette 10 is forced toward the heads and held at a position to permit normal engagement of the heads with the magnetic tape 11 within the cassette. In such condition, that end portion of the cassette force-out lever which is provided with the cut-away 30 lies at a position just beneath and spaced apart from the front edge 39' of the top of the lock member 34, namely, the edge which is adjacent to the head, or at a position somewhat projected downwardly of the underside of the top 39.

Now, in the position of FIG. 3, when the "eject" key EJC is depressed, the receptacle member 14 is pivotally raised thereby and in this case, the cassette force-out lever 26 is not locked by the lock member 34 as noted above, so that the lever 26, with the pivotal movement of the receptacle member, imparts the biasing force or force-out pressure of the spring 31 to the cassette 10, whereby the cassette 10 is forced out with the front face thereof engaged with the guide pins 12a and 12b. In this case, when the front face of the cassette 10 has exceeded the height of the guide pins 12a, 12b, the cassette 10 is forced out to the position shown in FIG. 1. Thus, the cassette 10 becomes ready to be removed from the receptacle member 14.

According to the above-described embodiment, as will be appreciated from the foregoing description, the "eject" key acts only to pivotally move the receptacle member 14 and this means a very small magnitude of force only required to depress that key and accordingly, great ease of the key operation. Also, the mechanism for forcing out the cassette inserted in the receptacle member 14 is constructed entirely independently of the mechanism for pivotally moving the receptacle member 14 and moreover, the force-out mechanism is of a very simple construction which only comprises the above-described force-out lever 26, the lock member 34 and a few parts associated therewith, and this leads to the benefits such as ease and low cost of the manufacture.

Figure 4A:
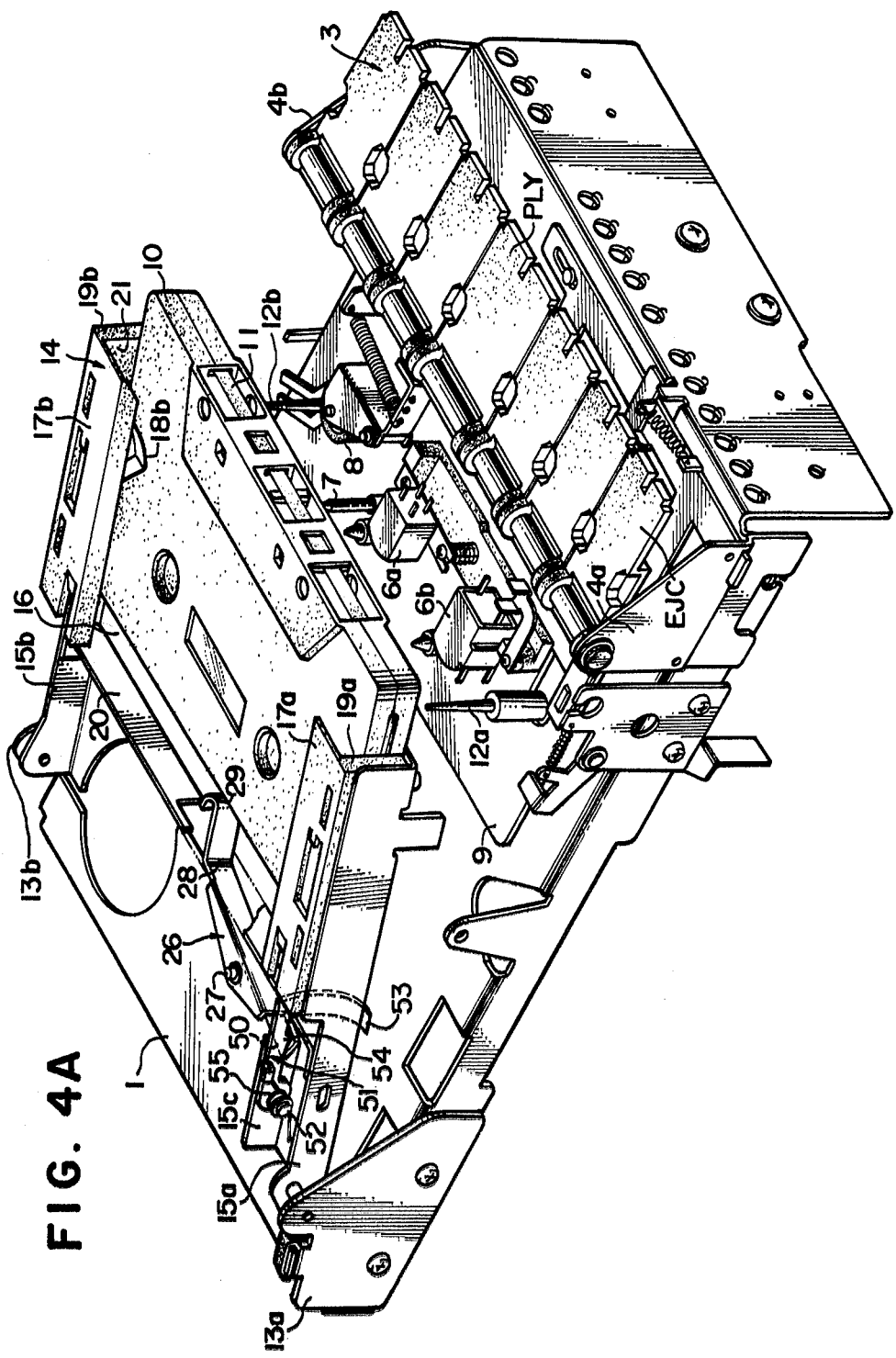
Figure 5A:
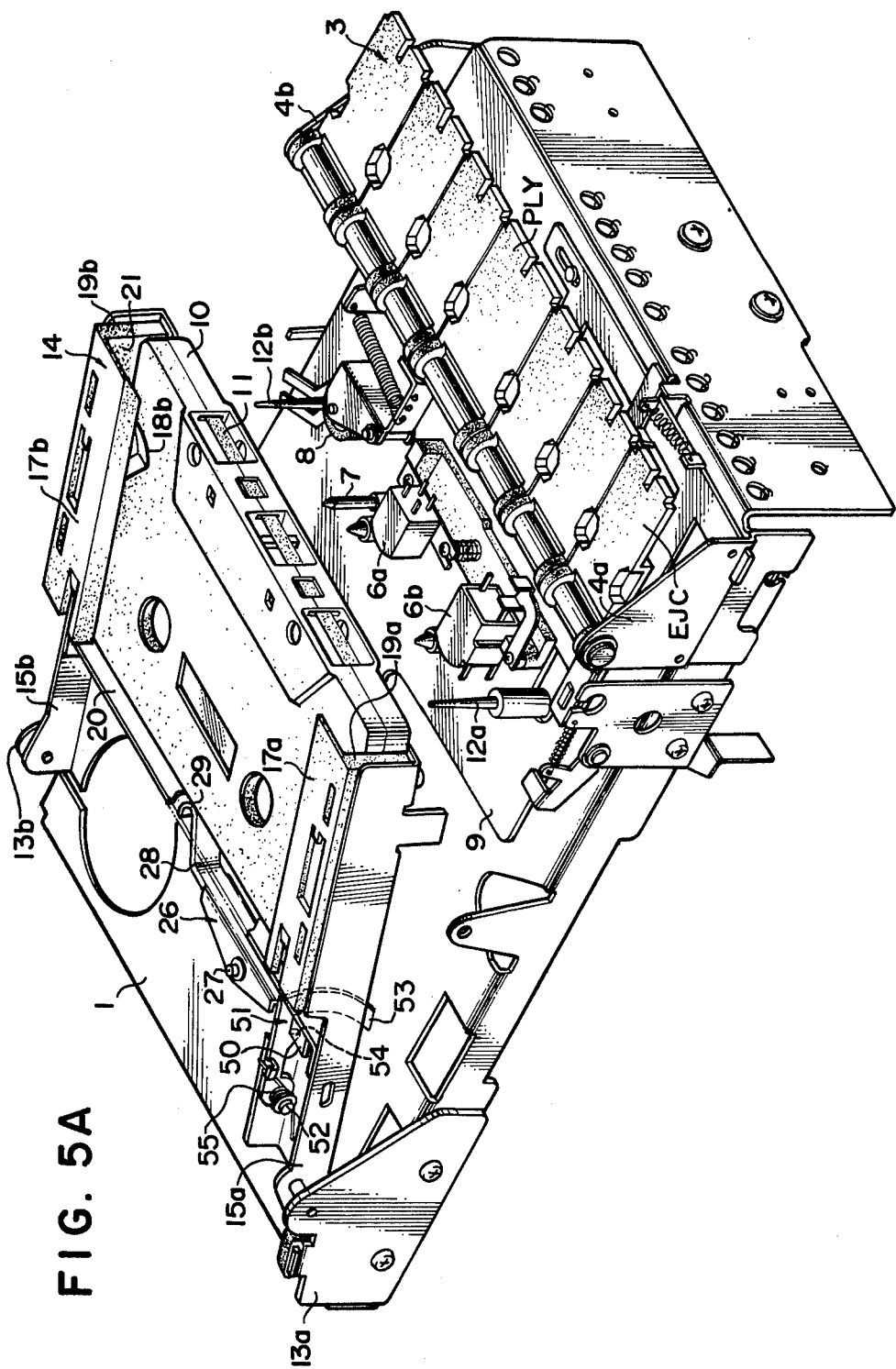
Figure 6B:
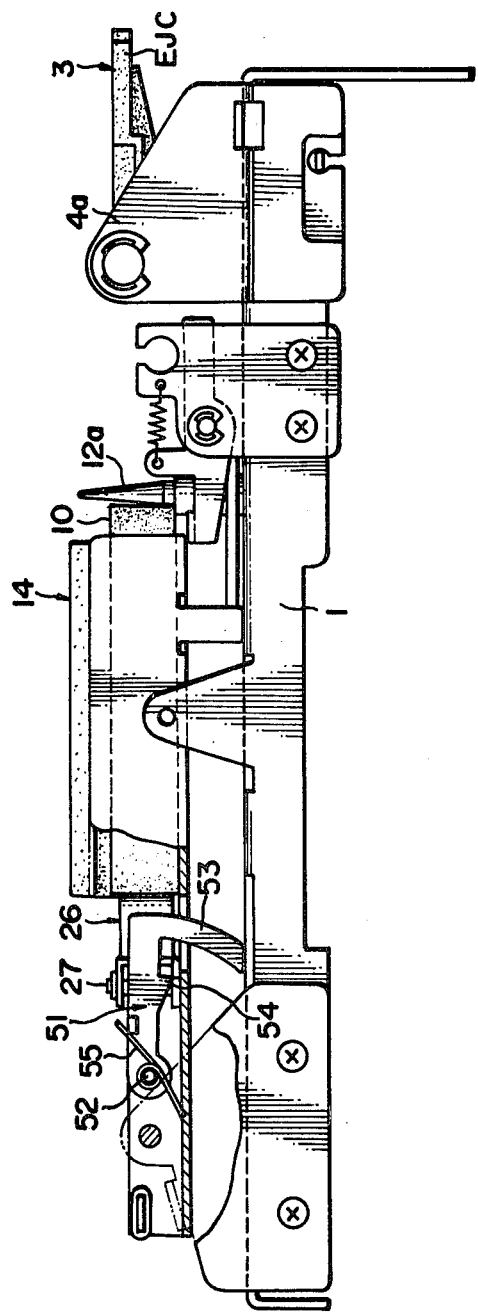

Referring now to FIGS. 4 to 6, there is illustrated the cassette tape recorder according to a second embodiment of this invention, wherein parts corresponding to FIGS. 1 to 3 are indicated by like reference numerals. In this embodiment, the other end portion of the cassette force-out member is formed into a planar portion substantially parallel to the principal surface of the receptacle member 14, the rear edge 50 of the planar portion serving as an engaging portion. In this instance, the rear edge of that planar portion may be formed with a cut-away which may be made to serve as the engaging portion. Also, the cassette force-out member 26 is spring-biased by a spring (not shown) mounted on the pin 27 so that said one end portion 29 thereof is extended into the receptacle member 14 when the cassette is not at all inserted in the receptacle member 14 or when the cassette is partly inserted in the receptacle member in the manner as shown in FIG. 4A.

The arm 15a of the receptacle member 14 has integrally formed therewith a mounting wall 15c extending in spaced apart and parallel relationship therewith, and a lock member 51 has one end portion thereof pivotally mounted on the mounting wall 15c by means of a pin 52. The end portion of this lock member 51, as indicated at 53, extends downwardly and somewhat bendingly in a plane substantially orthogonal to the principal surface of the receptacle member 14, and forms a bearing portion adapted to perform a function which will later be described. Further, a projection-like engaging portion 54 is formed in the lower edge of the lock member 51 at a substantially intermediate portion thereof. Still further, the lock member 51 has imparted thereto a spring bias in a direction for pivoting it toward the chassis 1 in said plane, by a spring 55 mounted on the pin 32' at the pivoted end portion of the lock member.

When the receptacle member 14 is in its inclined position with respect to the chassis and the cassette 10 is not at all inserted in the receptacle member, as shown in FIGS. 1A and 1B, then, by the action of the spring (not shown) loaded on the pin 27, the cassette force-out member 26 has the U-shaped end portion thereof extended into the receptacle member 14 in orthogonal relationship with the back wall of the cassette 10, and also has the obtusely bent portion 28 thereof retained by a suitable stop member (not shown) provided on the receptacle member. Thus, the force-out member is restrained in position by the stop member. In this case, the engaging portion 54 of the lock member 51 is disposed out of engagement with the engaging portion 50; thus the force-out member 26 is not constrained by the lock member 51 in any way.

In the position shown in FIG. 4, as the cassette 10 is further inserted into the receptacle member 14, said one end portion 29 of the cassette force-out member 26 is pushed by the back wall of the cassette to pivot the lever 26 against the biasing force of the spring (not shown) mounted on the pin 27 until the cassette 10 is fully inserted into the receptacle member 14 as shown in FIGS. 5A and 5B, whereupon the engaging portion 50 of the cassette force-out member 26 comes to be engaged by the engaging portion 54 of the lock member 51 and, since the engaging portion 54 of the lock member 51 is biased toward the chassis 1 by the spring 55, such engagement causes the cassette force-out member 26 to be locked in the position as shown in FIGS. 5A and 5B, wherein that end portion of the force-out member 26 opposite from the engaging portion 50 is substantially repelled from the receptacle member 14.

Subsequently, when the receptacle member 14 is manually depressed from the position of FIG. 5 to the position of FIG. 6 parallel to the chassis 1, namely, the horizontal position, the bearing portion 33 at the end of the lock member 51 strikes the chassis 1, as the result of which the lock member 51 is pivoted away from the chassis 1 against the biasing force of the spring 55, thereby releasing the above-described lock imparted to the engaging portion 50 of the cassette force-out member 26 by the engaging portion of the lock member 51. As the result, the biasing force or force-out pressure of the aforementioned spring (not shown) mounted on the pin 27 is imparted to the back wall of the cassette 10 by way of the cassette force-out member 26, whereby the cassette 10 is forced toward the heads 6a, 6b and held in a position wherein the magnetic tape 11 within the cassette is normally engageable by the heads. In this case, although not shown, the chassis 1 may be provided with means having a freely adjustable height which may comprise a screw, so that said bearing portion 54 may strike that means.

Now, in the position of FIG. 6, when the "eject" key EJC is depressed, the receptacle member 14 is pivotally raised thereby and in this case, the cassette force-out member 26 is not locked by the lock member 51 as noted above, so that the cassette force-out member 26, with the pivotal movement of the receptacle member 14, imparts to the cassette 10 the biasing force or force-out pressure of the spring (not shown) on the pin 27, whereby the cassette 10 is forced out with the front face thereof engaged with the guide pins 12a and 12b. In this case, when the lower edge of the cassette 10 has exceeded the height of the guide pins 12a, 12b, the cassette 10 is forced out to the position shown in FIG. 4. Thus, the cassette 10 becomes ready to be removed from the receptacle member 14.

According to the embodiment described above in connection with FIGS. 4 to 6, as will be appreciated from the foregoing description, the "eject" key acts only to pivotally move the receptacle member 14 and this means a very small magnitude of force only required to depress that key and accordingly, great ease of the key operation. Also, the mechanism for forcing out the cassette inserted in the receptacle member 14 is constructed entirely independently of the mechanism for pivotally moving the receptacle member 14 and moreover, the force-out mechanism is of a very simple construction which only comprises the above-described cassette force-out member 26, the lock member 51 and a few parts associated therewith, and especially, the lock member 51 may be simply formed by punching a metal plate, and this leads to the excellent merits such as simplicity of the entire construction and low cost of the manufacture.

Figure 8A:
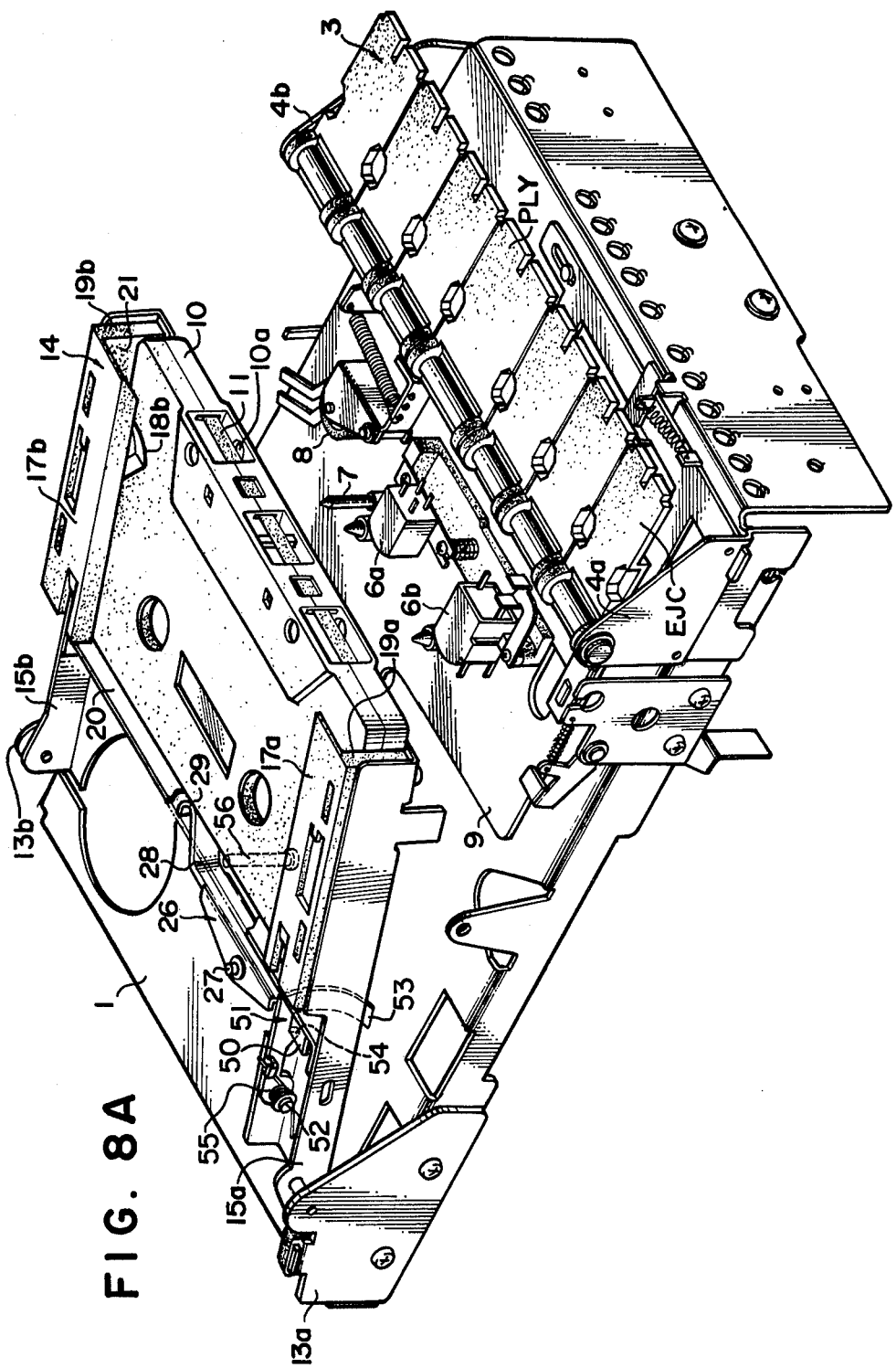
Figure 9B:
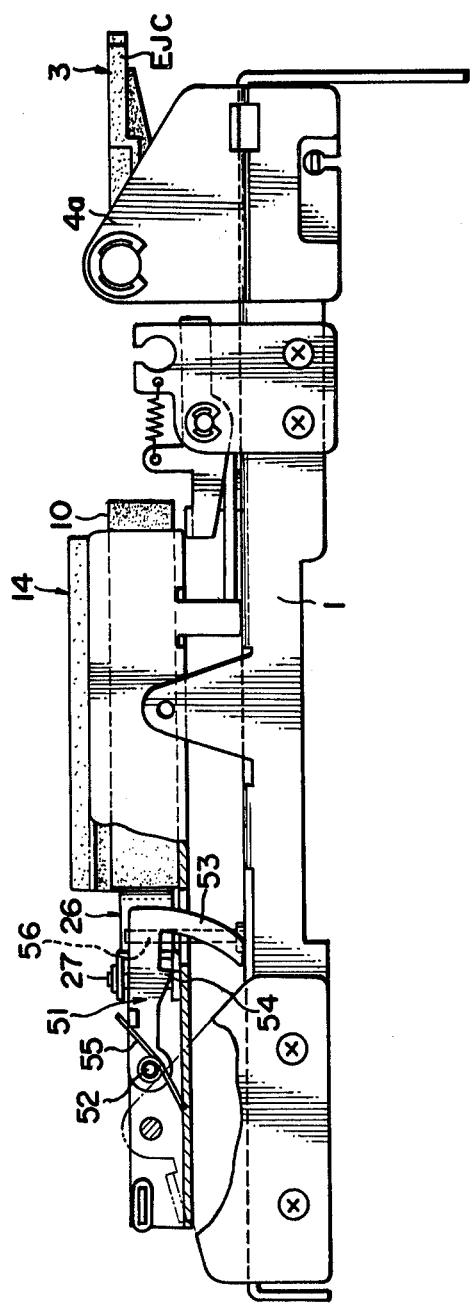

Referring to FIGS. 7 to 9, there is shown the cassette tape recorder according to a third embodiment of this invention, wherein parts corresponding to FIGS. 4 to 6 are indicated by like reference numerals. In this embodiment, it should be noted that a pin 56 is securely studded in the chassis 56 adjacent to the cassette force-out member 26 so as to restrict the pivotal movement of the cassette force-out member in a manner to be described. Preferably, the pin 56 should be adjustable in its height as desired. The operation of this embodiment will be described below.

Figure 7A:
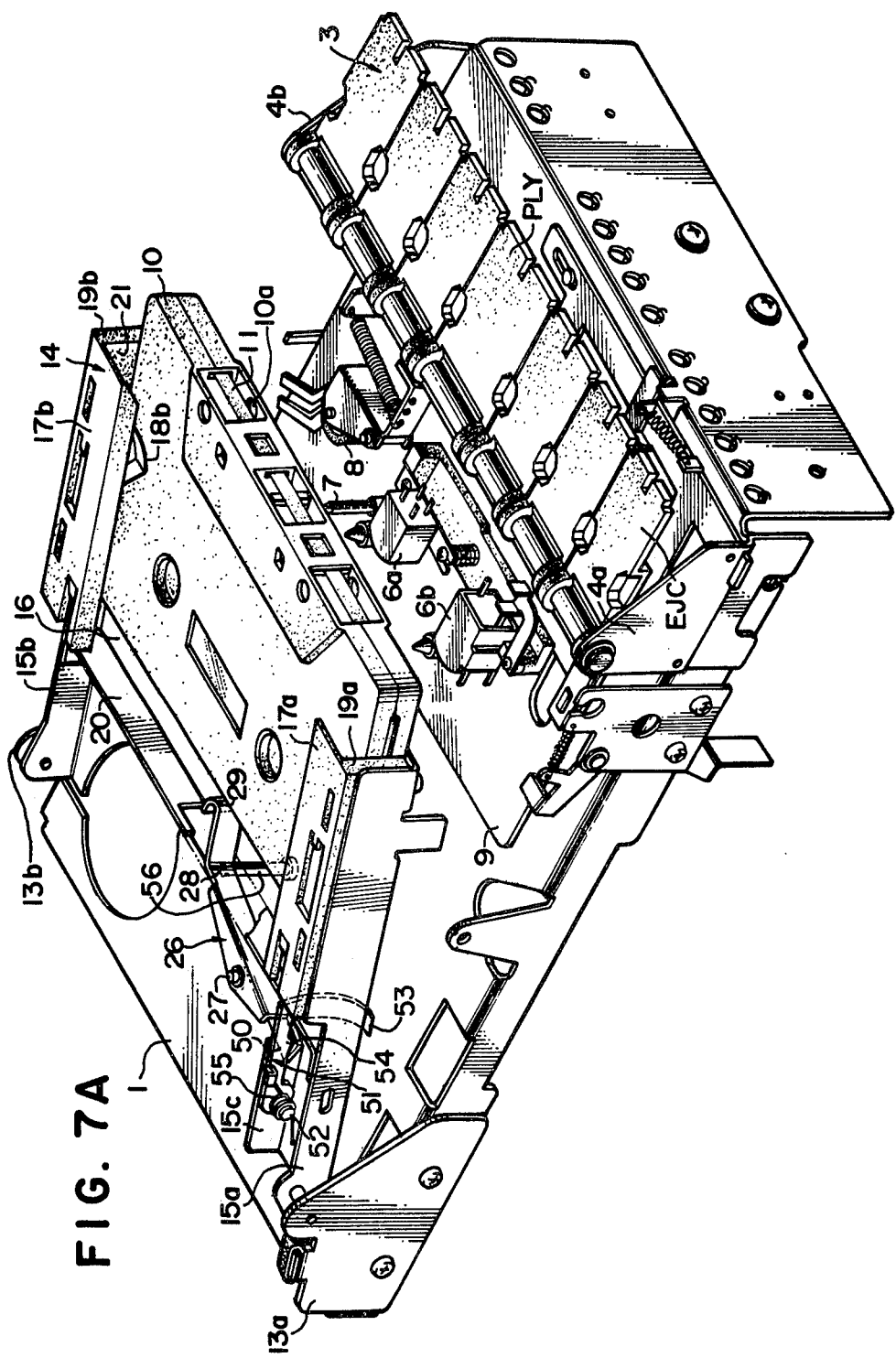

When the receptacle member 14 is in its inclined position with respect to the chassis and the cassette 10 is not at all inserted in the receptacle member, as shown in FIGS. 7A and 7B, then the cassette force-out member 26 has the U-shaped end portion 29 thereof extended into the receptacle member 14 in orthogonal relationship with the back wall of the cassette 10 by the action of the spring (not shown) loaded on the pin 27. In this case, the pin 56 is in such a positional relationship with respect to the cassette force-out member 26 that it lies behind and below the neighborhood of the bent portion 28 of that member. The engaging portion 54 of the lock member 51 is in non-engagement with the engaging portion 50 of the cassette force-out member 26 and thus, the cassette force-out member 26 is constrained by the lock member 51 in no way.

In the position shown in FIG. 7, as the cassette 10 is further inserted into the receptacle member 14, said one end portion 29 of the cassette force-out member 26 is pushed by the back wall of the cassette to pivot the lever 26 against the biasing force of the spring (not shown) mounted on the pin 27 until the cassette 10 is fully inserted into the receptacle member 14 as shown in FIGS. 8A and 8B, whereupon the engaging portion 50 of the cassette force-out member 26 comes to be engaged by the engaging portion 54 of the lock member 51 and, since the engaging portion 54 of the lock member 51 is biased toward the chassis 1 by the spring 55, such engagement causes the cassette force-out member 26 to be locked in the position as shown in FIGS. 8A and 8B, wherein that end portion of the force-out member 26 opposite from the engaging portion 50 is substantially repelled from the receptacle member 14. In this case, by the cassette force-out member 26 being pivoted as described above, the positional relationship of the pin 56 with respect to the cassette force-out member 26 is made such that the pin 56 lies ahead of and below the neighborhood of the bent portion 28 of the member 26.

Subsequently, when the receptacle member 14 is manually depressed from the position of FIG. 2 to the position of FIG. 3 parallel to the chassis 1, namely, the horizontal position, the cassette force-out member 26 is brought into a position wherein the pin 56 stands in front of the neighborhood of the bent portion 28 of the member 26, as seen in FIG. 9A. At the same time, the bearing portion 54 at the end of the lock member 51 strikes the chassis 1 and as the result, the lock member 51 is pivoted away from the chassis 1 against the biasing force of the spring 55, thereby releasing the above-described lock imparted to the engaging portion 50 of the cassette force-out member 26 by the engaging portion 54 of the lock member 51.

In the position shown in FIG. 9, when the "eject" key EJC is depressed, the receptacle member 14 is thereby pivoted to its inclined position shown in FIGS. 7 and 8 and in this case, the cassette force-out member 26 now unlocked by the lock member 51 tries to be pivoted by the aforementioned spring bias in a direction to force out the cassette 10, but in the position of FIG. 9, the pin 56 stands in front of the cassette force-out member 26 as already mentioned, so that the pivotal movement of the cassette force-out member 26 is blocked by the pin 56 and the pivotal member of the cassette force-out member 26 is not permitted until the lower edge thereof comes up to a level beyond the top of the pin 56. That is, in this case, the height of the pin 56 is selected such that the lower edge of the cassette force-out member 26 is brought to a level beyond the top of the pin 56 at a point of time whereat the receptacle member 14 is pivoted until it goes beyond the top of the capstan 7 (see FIG. 9A) inserted in the aperture 10a of the cassette 10 or the edge of the case. Thus, when the cassette force-out member 26 comes to a level above the pin 56, the cassette force-out member is pivoted, whereby the cassette 10 is forced out to the position shown in FIG. 7, thus becoming ready to be removed from the receptacle member 14.

According to the embodiment described above in connection with FIGS. 7 to 9, as will be appreciated from the foregoing description, the problems as mentioned at the outset can be overcome at a time by a simple construction in which a vertical pin is merely studded in the chassis, and without a pair of conventionally used tapered guide pins or ribs being provided as mentioned at the outset.

While the invention has been shown and described with respect to some specific embodiments, it should be understood that the invention is not restricted to such embodiments but includes all changes and modifications which will fall within the spirit and scope of the invention as defined in the appended claims.

What is claimed is:

1. A cassette tape recorder including cassette receiving means having an opening through which a cassette may be inserted or removed, said cassette receiving means being pivotable so as to selectively assume a position in which it is inclined with respect to the chassis of the tape recorder to permit insertion or removal of the cassette and a position in which it is parallel to said chassis to permit a magnetic tape within the cassette fully inserted in said cassette receiving means to be engaged by magnetic head means, characterized by a cassette eject mechanism comprising cassette force-out means mounted on said cassette receiving means at the opposite side thereof from said opening, said cassette force-out means being pivotable between a first position in which one end thereof is extended into said cassette receiving means so as to be engageable by the back wall of the cassette inserted in said cassette receiving means and a second position in which said one end is substantially repelled from said cassette receiving means upon said cassette being fully inserted in said cassette receiving means, said cassette force-out means being spring-biased toward said first position, and lock means mounted on said cassette receiving means for acting to lock said cassette force-out means in said second position when said cassette force-out means is pivoted to said second position against said spring bias upon the cassette being fully inserted in said cassette receiving means when in said inclined position and to unlock said cassette force-out means when said cassette receiving means with the cassette fully inserted therein is pivoted from said inclined position to said parallel position, said cassette force-out means being adapted to be resiliently pivoted from said second position to said first position by the action of said spring bias to cause said one end to force the cassette from said cassette receiving means when said cassette receiving means with the cassette fully inserted therein is pivoted from said parallel position to said inclined position.

2. A cassette tape recorder including cassette receiving means having an opening through which a cassette may be inserted or removed, said cassette receiving means being pivotable so as to selectively assume a position in which it is inclined with respect to the chassis of the tape recorder to permit insertion or removal of the cassette and a position in which it is parallel to said chassis to permit a magnetic tape within the cassette fully inserted in said cassette receiving means to be engaged by magnetic head means, characterized by a cassette eject mechanism comprising cassette force-out member mounted on said cassette receiving means at the opposite side thereof from said opening, said cassette force-out member being pivotable in a plane substantially parallel to the principal plane of said cassette receiving means and between a first position in which one end thereof is extended into said cassette receiving means so as to be engageable by the back wall of the cassette inserted in said cassette receiving means and a second position in which said one end is subtantially repelled from said cassette receiving means upon said cassette being fully inserted in said cassette receiving means, said cassette force-out member being formed with an engaging portion at the other end thereof, and a lock member mounted on said cassette receiving means and having a bearing portion at one end thereof and an engaging portion at an intermediate portion thereof, the other end portion of said lock member being pivotally connected to said cassette receiving means so as to be pivotable in a plane substantially orthogonal to said principal plane of said cassette receiving means, said lock member being biased toward said chassis at the other end thereof, said engaging portion of said lock member being engageable with said engaging portion of said cassette force-out member to lock said cassette force-out member in said second position when said cassette force-out member is pivoted to said second position against said spring bias with the cassette fully inserted in said cassette receiving means when in said inclined position, said bearing portion of said lock member being caused, when said cassette receiving means with the cassette fully inserted therein is pivoted from said inclined position to said parallel position, to directly or indirectly bear against said chassis to thereby pivot said lock member against said spring bias and bring said engaging portion of said lock member out of engagement with said engaging portion of said cassette force-out member, thereby releasing said cassette force-out member from said lock, and when said cassette receiving means is pivoted from said parallel position to said inclined position, said cassette force-out member being resiliently pivoted from said second position to said first position by the action of said spring bias to cause said one end to force the cassette out of said cassette receiving means.

3. A cassette tape recorder according to claim 2, wherein means having an adjustable height is provided on said chassis so that said bearing portion may bear against said means.

4. A cassette tape recorder including cassette receiving means having an opening through which a cassette may be inserted or removed, said cassette receiving means being pivotable so as to selectively assume a position in which it is inclined with respect to the chassis of the tape recorder to permit insertion or removal of the cassette and a position in which it is parallel to said chassis to permit a magnetic tape within the cassette fully inserted in said cassette receiving means to be engaged by magnetic head means, and cassette force-out member mounted on said cassette receiving means at the opposite side thereof from said opening, said cassette force-out member being pivotable between a first position in which one end thereof is extended into said cassette receiving means so as to be engageable by the back wall of the cassette inserted in said cassette receiving means and a second position in which said one end is substantially repelled from said cassette receiving means upon said cassette being fully inserted in said cassette receiving means, said cassette force-out member being spring-biased toward said first position, said cassette force-out member being adapted to be pivoted from said second position to said first position by the action of said spring bias to force out the cassette fully inserted in said cassette receiving means when said cassette receiving means is pivoted from said position parallel to said chassis to said position inclined with respect to said chassis, characterized by means provided adjacent to said cassette force-out member and adapted, when said force-out member tries to pivot from said second position to said first position by the action of said spring bias with said pivotal movement of said cassette receiving means from said position parallel to said chassis to said position inclined with respect to said chassis, to substantially restrict the pivotal movement of said cassette force-out member until said cassette receiving means is pivoted to a predetermined extent.

5. A cassette tape recorder according to claim 4, wherein said means adapted to restrict the pivotal movement of said force-out member comprises a vertical pin-like member provided on said chassis.

6. A cassette tape recorder according to claim 5, wherein said vertical pin-like member is adjustable in its height.

* * * * *